(12) United States Patent
Schriever et al.

(10) Patent No.: US 11,961,985 B2
(45) Date of Patent: Apr. 16, 2024

(54) HIGH-VOLTAGE BATTERY FOR AN ELECTRICALLY POWERED VEHICLE

(71) Applicant: VOLKSWAGEN AKTIENGESELLSCHAFT, Wolfsburg (DE)

(72) Inventors: Udo Schriever, Braunschweig (DE); Jonathan Häde, Braunschweig (DE); Christoph Hagedorn, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 228 days.

(21) Appl. No.: 17/167,940

(22) Filed: Feb. 4, 2021

(65) Prior Publication Data
US 2021/0249709 A1    Aug. 12, 2021

(30) Foreign Application Priority Data

Feb. 7, 2020   (DE) ................. 10 2020 201 494.9

(51) Int. Cl.
*H01M 10/00*    (2006.01)
*H01M 10/0525*    (2010.01)
(Continued)

(52) U.S. Cl.
CPC ..... *H01M 10/658* (2015.04); *H01M 10/0525* (2013.01); *H01M 10/613* (2015.04);
(Continued)

(58) Field of Classification Search
CPC ........... H01M 10/658; H01M 10/0525; H01M 10/613; H01M 10/647; H01M 50/24; H01M 2220/20
See application file for complete search history.

(56) References Cited

U.S. PATENT DOCUMENTS 10,158,102 B2 * 12/2018 Wu ..................... H01M 50/293
2012/0251872 A1 * 10/2012 Kim ..................... H01M 50/505
429/159

(Continued)

FOREIGN PATENT DOCUMENTS

CN    210006842 U    1/2001
CN    109216628 A    1/2009
(Continued)

OTHER PUBLICATIONS

Modified translation of CN206163536U as taught by Hua et al (Year: 2017).*

(Continued)

*Primary Examiner* — Cynthia H Kelly
*Assistant Examiner* — Monique M Wills
(74) *Attorney, Agent, or Firm* — PEARL COHEN ZEDEK LATZER BARATZ LLP

(57) ABSTRACT

A high-voltage battery, in the battery housing of which a number of cell modules are arranged, wherein combustion gas emitted in the event of a thermal battery cell event in a battery cell of one of the cell modules flows freely to an emergency degassing outlet of the battery housing via an installation gap inside the battery. A number of separate heat shield material portions are arranged in the installation gap inside the battery between the cell module top and the housing cover, each of which is associated with a cell module and has at least one elastically resilient pressing element which pushes the heat shield material portion with a pressing force such that the heat shield material portion is in pressed contact with the top of the cell module.

6 Claims, 5 Drawing Sheets

(51) Int. Cl.
*H01M 10/613* (2014.01)
*H01M 10/647* (2014.01)
*H01M 10/658* (2014.01)
*H01M 50/24* (2021.01)
*H01M 50/30* (2021.01)

(52) U.S. Cl.
CPC ......... *H01M 10/647* (2015.04); *H01M 50/24* (2021.01); *H01M 50/30* (2021.01); *H01M 2220/20* (2013.01)

(56) References Cited

U.S. PATENT DOCUMENTS

| | | | |
|---|---|---|---|
| 2013/0309538 A1* | 11/2013 | Pfeiffer | H01M 10/0525 29/446 |
| 2015/0037662 A1* | 2/2015 | Pinon | H01M 50/105 29/623.2 |
| 2019/0198830 A1* | 6/2019 | Kawakami | H01M 10/0481 |
| 2019/0207184 A1 | 7/2019 | Koutari et al. | |
| 2019/0296293 A1 | 9/2019 | Scharner | |

FOREIGN PATENT DOCUMENTS

| | | | | |
|---|---|---|---|---|
| CN | 206163536 U | * | 5/2017 | |
| CN | 210006842 U | * | 1/2020 | |
| DE | 10 2018 210 151 A1 | | 12/2019 | |
| JP | 2007005057 A | | 1/2007 | |
| JP | 2019091628 A | * | 6/2019 | ............ B62D 1/181 |
| JP | 2019091628 A1 | | 6/2019 | |
| WO | WO 2018/108371 A1 | | 6/2018 | |

OTHER PUBLICATIONS

Original translation of CN-206163536-U as taught by Hua et al. (Year: 2017).*

English translation, JP-2019091628-A as taught by Dong (Year: 2019).*

English translation CN 210006842U as taught by Chang (Year: 2020).*

Office Action for Chinese Patent Application 2021101596021.1, dated Sep. 25, 2022.

* cited by examiner

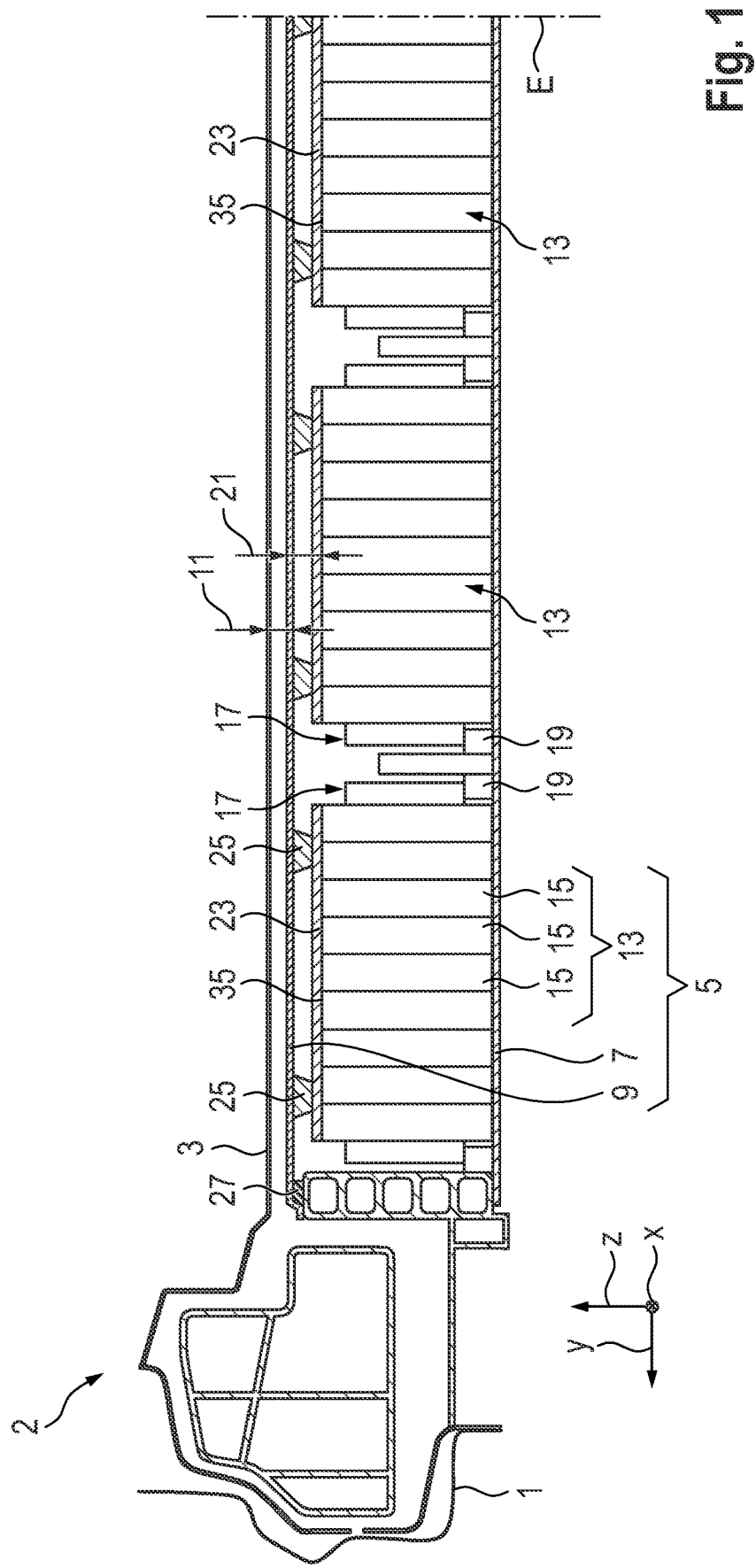

HIGH-VOLTAGE BATTERY FOR AN ELECTRICALLY POWERED VEHICLE

CROSS REFERENCE TO RELATED APPLICATIONS

This application claims priority from German Patent Application No. 10 2020 201 494.9, filed Feb. 7, 2020, the entire contents of which are incorporated by reference.

FIELD OF THE INVENTION

The invention relates to a high-voltage battery for an electrically powered vehicle.

BACKGROUND OF THE INVENTION

The high-voltage battery installed in an electrically powered vehicle has a load-bearing battery housing in which a number of cell modules are arranged. A cell assembly of battery cells, which are implemented as lithium-ion cells, is arranged in the module housing of each cell module.

In a generic high-voltage battery, the cell modules are spaced apart from the housing cover of the battery housing in a vertical direction of the housing via an installation gap at the top of the cell module. In the case of a thermal event in a battery cell of the cell module, combustion gas is emitted, which gas is directed to an emergency degassing outlet in the battery housing via the installation gap.

In the prior art, measures are taken in the design to ensure a sufficiently long evacuation time in such a thermal event, within which time the vehicle occupants can safely leave the vehicle. For example, a heat shield material in the form of a large panel can be positioned in the housing interior below the housing cover. The heat shield material panel protects the battery housing from the combustion gas exiting the cell module. In this design, however, the combustion gas is passed directly above the neighboring, functional cell modules, as a result of which said cell modules also heat up and emit gas. In addition, the large heat shield material panel requires a large installation space, which impairs the flow of combustion gas in the installation gap and thus leads to a heat build-up in the interior of the high-voltage battery housing. This also promotes heating of the still-functional cell modules.

A battery unit for a traction battery of a vehicle is known from WO 2018/108371 A1. A battery module having lithium-ion cells is known from JP 2 019 091 628 A.

SUMMARY OF THE INVENTION

The problem addressed by the invention is that of providing a high-voltage battery of a simple design in which a sufficiently long evacuation time can be provided in the event of a thermal event of the high-voltage battery. In addition, it is intended to prevent the neighboring modules from being damaged by overheating.

According to the invention, a number of separate heat shield material portions are arranged in the installation gap between the top of the cell module and the housing cover. Each of the heat shield material portions is associated with exactly one cell module. In addition, each heat shield material portion has at least one elastically resilient pressing element which pushes the heat shield material portion with a predefined pressing force such that the heat shield material portion is in pressed contact with the top of the relevant cell module (that is, the cell module cover).

The heat shield material portion according to the invention is designed to have considerably thinner walls compared to the prior art. According to the invention, the cell module is thus protected by a thin-walled heat shield material portion on the cell module cover. In this case, the heat shield material portion is pressed or tensioned against the cell module by means of an elastic material. For example, the relevant heat shield material portion can be pressed down from above by means of the battery cover via an elastic material. In the case of a gas-emitting battery cell, the heat shield material is pressed upward against the battery cover by the momentum of the hot combustion gas being emitted. As a result, the combustion gas can escape from the cell and be guided through the installation gap to an emergency degassing outlet in the battery housing and from there can escape to the exterior. The remaining, functional cell modules are not damaged in this case because the heat shield material portions are then still held in position on top of the relevant cell module by means of the elastic materials.

In the event of a thermal event, the invention allows for a free flow of combustion gas from a gas-emitting battery cell. All other, still functional cell modules are in this case thermally shielded by means of the respective heat shield material portions. The protection according to the invention can be implemented in a significantly more installation space-saving manner compared to the prior art and can be used for all cell types.

In a preferred embodiment, the elastically resilient pressing element can be formed from a foam material. It is advantageous in terms of manufacturing if both the pressing element and a liquid seal implemented as a sealing bead between the housing cover and the lower part of the housing are made of identical material, for example from the foam material mentioned above. The pressing element secures the heat shield material portion in place and presses it onto the cell module. In case of a thermal event in a battery cell, the combustion gas being emitted pushes the heat shield material portion in the direction of the housing cover with a momentum force counter to the pressing force (heat shield material portion is lifted). This allows the combustion gas to escape into the installation gap and to be guided to the emergency degassing outlet of the battery housing.

The elastically resilient pressing element can preferably be supported between the housing cover and the heat shield material portion. In this case, the pressing element is positioned directly in the installation gap between the housing cover and the heat shield material portion.

With regard to simple handling during the assembly of the high-voltage battery, it is preferred if the elastically resilient pressing element is firmly attached at its element base either to the housing cover or to the relevant heat shield material portion. In contrast to this, the element apex of the pressing element can abut the opposite heat shield material portion or housing cover without being attached.

The pressing element can optionally be arranged over its entire surface over substantially the entire surface of the relevant heat shield material portion. Alternatively, the pressing element can provide a greatly reduced pressing surface compared to the surface of the heat shield material portion. In this case, a plurality of pressing elements spaced apart from one another can be positioned between the housing cover and the heat shield material portion.

In an alternative embodiment, the elastically resilient pressing element can be implemented as at least one elastic tensioning strap, by means of which the heat shield material portion can be attached to the cell module. The tensioning strap can exert a pre-tension onto the heat shield material portion, by means of which the heat shield material portion is pressed against the top of the cell module with a pressing force.

The tensioning strap can be replaced by any type of spring element. In addition, there is the option of securing the heat shield material using a low-strength adhesive or another fastening element. The element tears or breaks if a thermal event occurs.

The invention prevents a thermal event from spreading to neighboring, still functional cell modules, which significantly mitigates the consequences for the vehicle and the environment. The hot combustion gas generated in the thermal event is discharged in a targeted manner, which reduces the heating of neighboring cell modules and extends the time it takes to spread to neighboring, still-functional cell modules.

BRIEF DESCRIPTION OF THE DRAWINGS

Embodiments of the invention are described below with reference to the attached drawings, in which:

FIG. 1 is a half-sectional view of a bottom-side bodywork structure of an electrically powered vehicle having a high-voltage battery installed therein;

DETAILED DESCRIPTION OF THE INVENTION

Figure 1A:
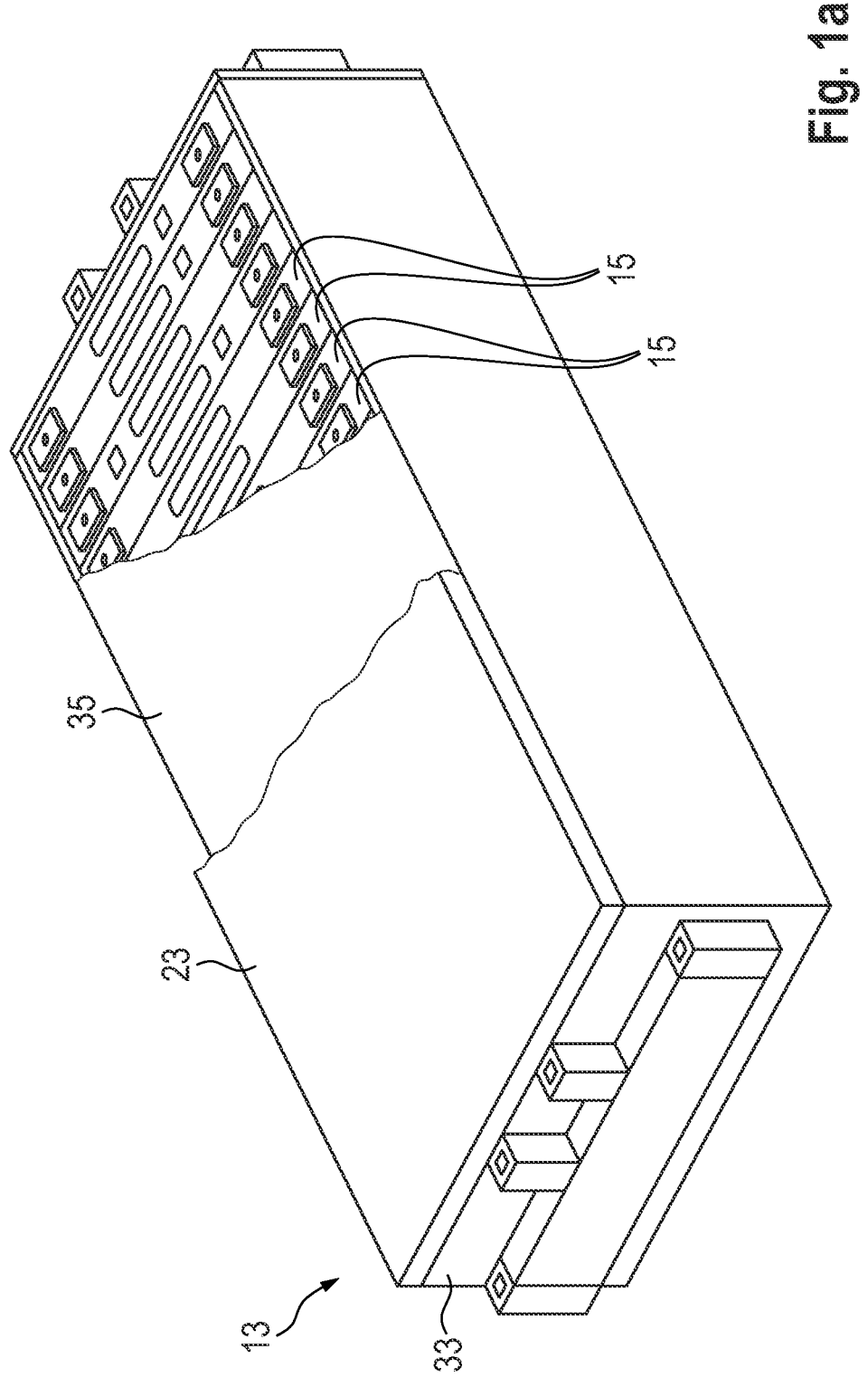
FIG. 1a shows a single cell module.

FIG. 1 shows a bottom-side bodywork structure of a two-track vehicle in a half-sectional view, which is described below to the extent necessary for an understanding of the invention. According to said figure, the bottom-side bodywork structure has two lateral rocker panels 1 extending in the longitudinal direction x of the vehicle, of which only one is shown in FIG. 1. The right half of the vehicle, not shown in FIG. 1, is substantially a mirror image of the illustrated left half of the vehicle. The rocker panel 1 extends in the longitudinal direction of the vehicle and forms a bottom-side door entry region 2 for vehicle occupants. A high-voltage battery 5 is installed on the underside of a vehicle bottom 3 of the bodywork structure. Said battery extends in an installation space between the two rocker panels 1 in the transverse direction y of the vehicle. The high-voltage battery 5 is positioned at approximately the same height as the rocker panel 1 in FIG. 1.

As is further apparent in FIG. 1, the high-voltage battery 5 has a battery housing which is constructed from a lower housing part 7 and an upper housing cover 7, which cover is spaced apart from the vehicle bottom 3 arranged above it via an installation gap 11.

Figure 2:
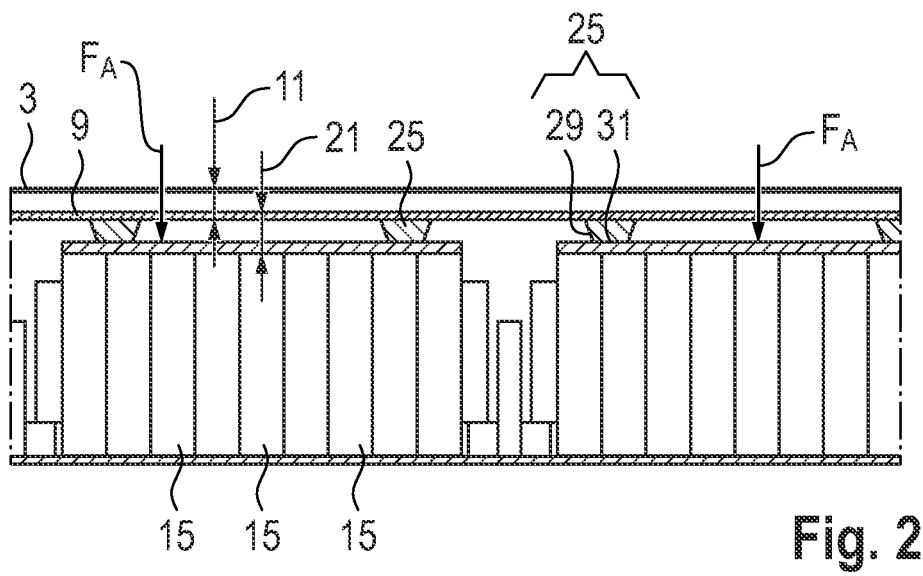
FIG. 2 is an enlarged partial sectional view of the high-voltage battery.

A number of cell modules 13 are arranged in the housing interior of the high-voltage battery 5. A cell assembly of battery cells 15 is arranged in the module housing of each cell module 13, which battery cells 15 are implemented as lithium-ion cells. In FIG. 1, each of the cell modules 13 is bolted to bottom mounts 19 of the battery housing at indicated screw points 17. In FIGS. 1 and 2, the cell modules 13 are spaced apart from the housing cover 9 of the battery housing in the vertical direction z of the housing at the top of the cell modules (i.e., at the cell module cover 35 according to FIGS. 1 and 1a) via an installation gap 21 inside the battery. In FIGS. 1 and 2, a number of separate heat shield material portions 23 are arranged in the installation gap 21 inside the battery between the cell module top 35 and the housing cover 9. Each of the heat shield material portions 23 is associated with exactly one cell module 13. The heat shield material portions 23 furthermore have elastically resilient pressing elements 25. In normal operation, these pressing elements are positioned uncompressed in the installation gap 21 between the housing cover 9 and the top of the cell module, according to FIGS. 1 and 2.

In FIG. 1, the housing cover 9 is mounted on the edge of the lower housing part 7, with a sealing bead 27 acting as a liquid seal interposed between the two. According to FIGS. 1 and 2, two pressing elements 25 are provided for each cell module 13, which pressing elements 25 are reduced in area compared to the relevant heat shield material portion 23. In FIGS. 1 and 2, these pressure elements are simply manufactured from a foam material which is also used to manufacture the sealing bead 27 between the housing cover 9 and the lower housing part 7.

The pressing elements 25 shown in FIG. 1 or 2 are attached (i.e., glued) to the housing cover 9 with their element base 29 (FIG. 2). By contrast, the element apex 31 of the pressing elements 25 is unattached with respect to the heat shield material portion 23.

The functioning of the heat shield material portions 23 according to the invention in the event of a thermal event T in one of the lithium-ion cells 15 is described below with reference to FIG. 3: in this case, the damaged cell 15 and the cell module top 35 open, and hot combustion gas and glowing particles escape. Due to the combustion gas and particles being emitted, the heat shield material portion 23 is pushed in the direction of the housing cover 9 with a momentum force counter to the pressing force $F_A$, as a result of which the combustion gas, together with the particles, can escape into the installation gap 21 inside the battery. From there, the combustion gas and the particles are guided along the installation gap 21 in the direction of arrow A (FIG. 3) to an emergency degassing outlet, not shown, of the battery housing. From there, the combustion gas escapes to the exterior of the battery.

Figure 3:
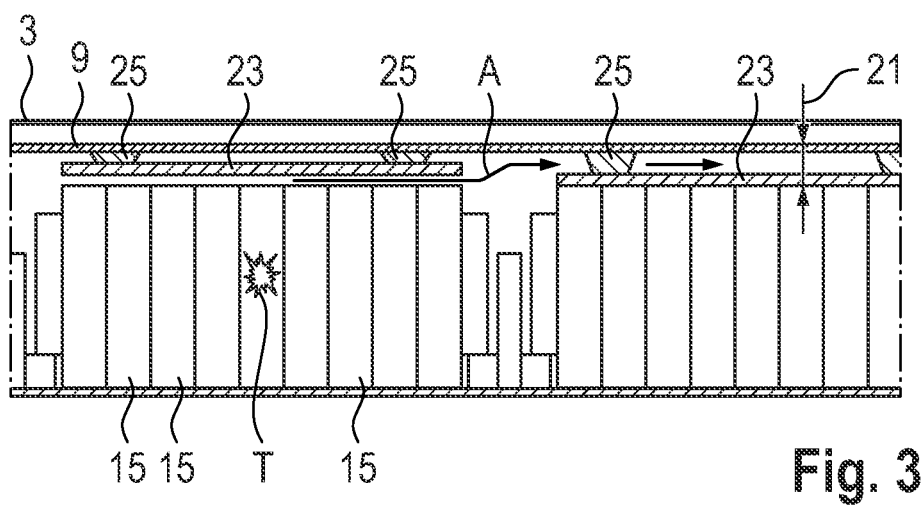
FIG. 3 is a view corresponding to FIG. 2, illustrating a thermal event.

As is apparent in FIG. 3, the heat shield material portions 23 of the still-functional neighboring cell modules 13 remain in pressed contact with the cell module top 35 without change. The combustion gas is therefore not guided directly past the tops 35 of the neighboring cell modules 13 in the installation gap 21, but rather past an intermediate layer of the heat shield material portions 23. This prevents the thermal event T from spreading to neighboring cell modules 13.

Figure 4:
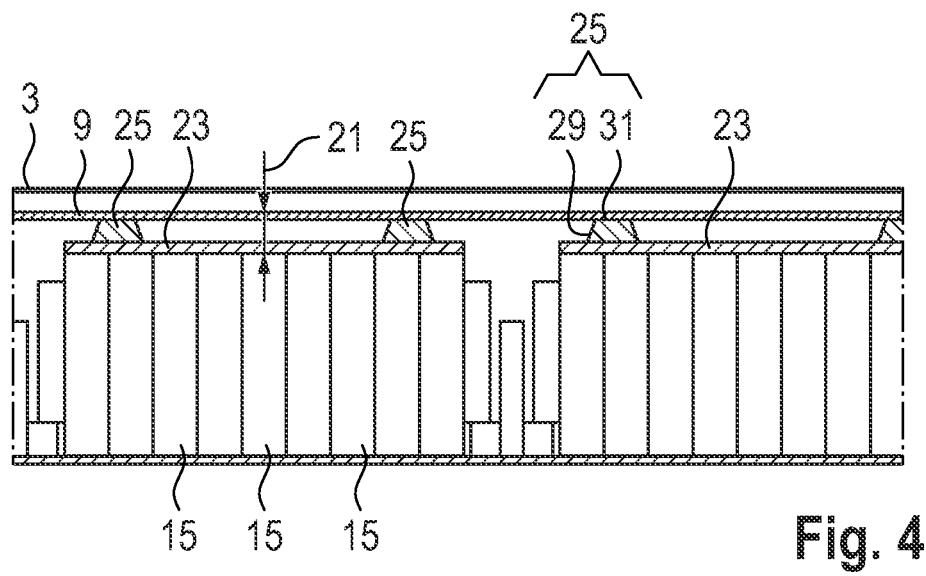
FIGS. 4, 5 and 6 each show embodiment variants of the embodiment shown in FIG. 2.

Further embodiment variants of the invention are described below with reference to FIGS. 4 to 6. In FIG. 4, the pressing elements 25 are no longer attached to the housing cover 9 with their relevant base 29, but rather are firmly attached to the relevant heat shield material portion 23. Otherwise, the embodiment in FIG. 4 corresponds to the embodiment in FIG. 2.

Figure 5:
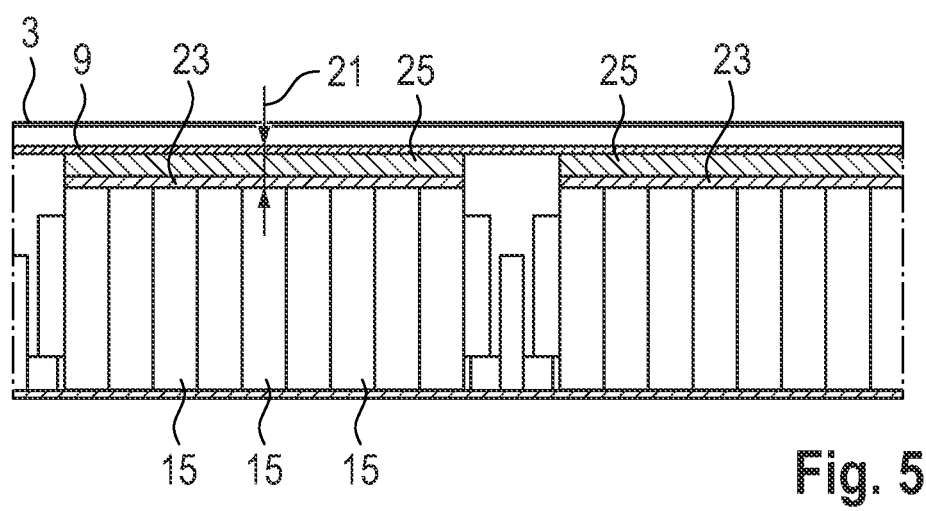

In FIG. 5, a large number of small pressing elements 25 per cell module 13 are not provided. Instead, only one elastically resilient pressing element 25 is used per cell module 13 in FIG. 5, which pressing element 25 extends over the entire surface of the relevant heat shield material portion 23.

Figure 6:
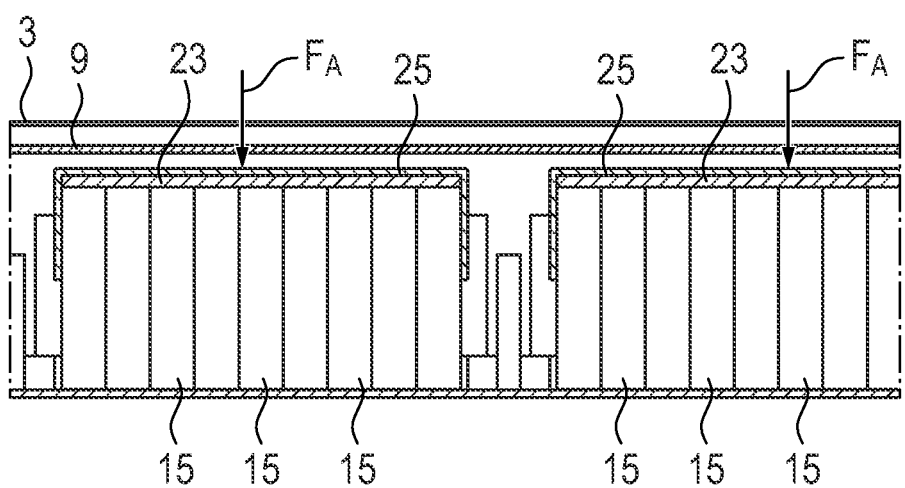

In FIG. 6, the elastically resilient pressing element 25 is no longer implemented as a pressing element positioned between the housing cover 9 and the heat shield material portion 23, but rather as a tensioning strap. According to FIG. 6, the elastic tensioning strap 25 is fastened directly to the side walls 33 of the cell modules 13, independently of the battery cover 9. By means of the tensioning strap 25, a pre-tension is exerted onto the relevant heat shield material portion 23, by means of which the heat shield material portion 23 can be pressed against the top of the cell module with the pressing force $F_A$.

LIST OF REFERENCE SIGNS

1 Rocker panel
2 Door entry region
3 Vehicle bottom
5 High-voltage battery
7 Lower housing part
9 Housing cover
11 Installation gap outside the battery
13 Cell modules
15 Battery cells
17 Screw points
19 Bottom mount
21 Installation gap inside the battery
23 Heat shield material portion
25 Pressing element
27 Sealing bead
29 Element base
31 Element apex
33 Cell module side walls
35 Cell module cover
E Longitudinal central vehicle plane
T Thermal event
$F_A$ Pressing force

The invention claimed is:

1. A high-voltage battery, comprising:
a battery housing having a cover,
a number of cell modules arranged within the battery housing, each cell module having a top that is spaced apart from the battery housing cover in a vertical direction of the housing via an installation gap inside the battery,
wherein, in the event of a thermal battery cell event in a battery cell of one of the cell modules, combustion gas is emitted and flows freely to an emergency degassing outlet of the battery housing via the installation gap inside the battery, and
a number of separate heat shield material portions arranged in the installation gap inside the battery between the cell module top and the housing cover, each of which heat shield material portions is associated with a cell module, wherein each heat shield material portion has at least one elastically resilient pressing element which is configured to push the heat shield material portion with a pressing force such that the heat shield material portion is in pressed contact with the top of the cell module,
wherein the at least one elastically resilient pressing element provides a reduced pressing surface comparative to the surface of the heat shield material portion.

2. The high-voltage battery according to claim 1,
wherein, during normal operation, all heat shield material portions are in pressed contact with the cell module top,
wherein, in the event of a thermal event in a cell module, the combustion gas being emitted pushes the heat shield material portion counter to the pressing force with a momentum force in the direction of the housing cover, as a result of which the combustion gas escapes into the installation gap inside the battery, and
wherein the heat shield material portions of the functional cell modules remain in pressed contact with the cell module top without change.

3. The high-voltage battery according to claim 1, wherein the elastically resilient pressing element is supported between the housing cover and the heat shield material portion.

4. The high-voltage battery according to claim 1,
wherein the elastically resilient pressing element is formed from a foam material, and/or
wherein a liquid seal, which is implemented as a sealing bead between the housing cover and the lower housing part, and the pressing element are of identical material.

5. The high-voltage battery comprising:
a battery housing having a cover,
a number of cell modules arranged within the battery housing, each cell module having a top that is spaced apart from the battery housing cover in a vertical direction of the housing via an installation gap inside the battery,
wherein, in the event of a thermal battery cell event in a battery cell of one of the cell modules, combustion gas is emitted and flows freely to an emergency degassing outlet of the battery housing via the installation gap inside the battery, and
a number of separate heat shield material portions arranged in the installation gap inside the battery between the cell module top and the housing cover, each of which heat shield material portions is associated with a cell module, wherein each heat shield material portion has at least one elastically resilient pressing element which is configured to push the heat shield material portion with a pressing force such that the heat shield material portion is in pressed contact with the top of the cell module,
wherein the at least one elastically resilient pressing element provides a reduced pressing surface comparative to the surface of the heat shield material portion,
wherein the elastically resilient pressing element is attached at its element base to the housing cover or to the corresponding heat shield material portion, and
wherein the element apex of the pressing element is unattached with respect to the heat shield material portion or the housing cover.

6. The high-voltage battery according to claim 1,
wherein the elastically resilient pressing element is a tensioning strap,
wherein the tensioning strap is attached to the cell module housing independently of the battery cover, and
wherein the tensioning strap exerts a pre-tension onto the heat shield material portion, and
wherein the heat shield material portion is configured to press against the cell module top with the pressing force.

* * * * *